United States Patent
Li et al.

(10) Patent No.: US 10,511,213 B2
(45) Date of Patent: Dec. 17, 2019

(54) METHOD AND APPARATUS FOR DETERMINING MAGNETIC FLUX AND MAGNETIC FORCE IN A SOLENOID ASSEMBLY

(71) Applicant: GM Global Technology Operations LLC, Detroit, MI (US)

(72) Inventors: Shifang Li, Shelby Township, MI (US); Thomas W. Nehl, Shelby Township, MI (US); Suresh Gopalakrishnan, Troy, MI (US); Avoki Omekanda, Rochester, MI (US); Rashmi Prasad, Troy, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 15/723,476

(22) Filed: Oct. 3, 2017

(65) Prior Publication Data

US 2019/0103797 A1    Apr. 4, 2019

(51) Int. Cl.
| | |
|---|---|
| *H01H 47/00* | (2006.01) |
| *H02K 33/18* | (2006.01) |
| *H01F 7/18* | (2006.01) |
| *F02M 47/02* | (2006.01) |
| *F02M 63/00* | (2006.01) |
| *H01F 7/08* | (2006.01) |

(Continued)

(52) U.S. Cl.
CPC ............ *H02K 33/18* (2013.01); *F02M 47/027* (2013.01); *F02M 51/0642* (2013.01); *F02M 61/12* (2013.01); *F02M 63/0024* (2013.01); *H01F 7/04* (2013.01); *H01F 7/081* (2013.01); *H01F 7/18* (2013.01); *H02K 33/02* (2013.01); *H02K 33/10* (2013.01); *H01F 2007/1669* (2013.01); *H01F 2007/1684* (2013.01)

(58) Field of Classification Search
None
See application file for complete search history.

(56) References Cited

U.S. PATENT DOCUMENTS

| | | | | |
|---|---|---|---|---|
| 6,208,497 B1* | 3/2001 | Seale | ......................... | F01L 9/04 361/154 |
| 7,099,136 B2* | 8/2006 | Seale | ......................... | F01L 9/04 123/90.11 |

(Continued)

*Primary Examiner* — Stephen W Jackson
(74) *Attorney, Agent, or Firm* — Quinn IP Law

(57) ABSTRACT

A solenoid assembly includes a solenoid actuator having a core. A coil is configured to be wound at least partially around the core such that a magnetic flux ($\phi$) is generated when an electric current flows through the coil. An armature is configured to be movable based on the magnetic flux ($\phi$). A controller has a processor and tangible, non-transitory memory on which is recorded instructions for controlling the solenoid assembly. The controller is configured to obtain a plurality of model matrices, a coil current ($i_1$) and an eddy current ($i_2$). The magnetic flux ($\phi$) is obtained based at least partially on a third model matrix ($C_0$), the coil current ($i_1$) and the eddy current ($i_2$). Operation of the solenoid actuator is controlled based at least partially on the magnetic flux ($\phi$). In one example, the solenoid actuator is an injector.

20 Claims, 2 Drawing Sheets

(51) Int. Cl.
*F02M 61/12* (2006.01)
*H02K 33/02* (2006.01)
*H01F 7/04* (2006.01)
*H02K 33/10* (2006.01)
*F02M 51/06* (2006.01)
*H01F 7/16* (2006.01)

(56) References Cited

U.S. PATENT DOCUMENTS

| | | | | |
|---|---|---|---|---|
| 7,813,904 | B2 * | 10/2010 | Kang | G06F 17/5009 |
| | | | | 703/2 |
| 10,114,082 | B1 * | 10/2018 | Derego | G01R 33/0023 |
| 2010/0259861 | A1 * | 10/2010 | Wendt | H01H 47/32 |
| | | | | 361/160 |

* cited by examiner

METHOD AND APPARATUS FOR DETERMINING MAGNETIC FLUX AND MAGNETIC FORCE IN A SOLENOID ASSEMBLY

INTRODUCTION

The present disclosure relates generally to control of a solenoid assembly and more particularly, to determination of magnetic flux and magnetic force in the assembly. Solenoids are employed in a wide array of devices, such as for example, in fuel injectors in a vehicle. Multiple injections of fuel by a fuel injector that are closely spaced in time and in small quantities may provide many benefits, including reduced fuel penetration, improved mixing, turbulence generation, fewer particulates, improved stability and burn rate modulation for advanced lean combustion engines. However, these injections may result in inaccurate metering due to various issues.

SUMMARY

Disclosed herein is a solenoid assembly and a method of controlling the solenoid assembly. The solenoid assembly includes a solenoid actuator having a core. In one example, the solenoid actuator is an injector. A coil is configured to be wound at least partially around the core such that a magnetic flux ($\phi$) is generated when an electric current flows through the coil. The coil defines a coil turn number (N). An armature is configured to be movable based on the magnetic flux ($\phi$). The armature defines a position (x) and an armature velocity (dx/dt). A controller is operatively connected to the coil and has a processor and tangible, non-transitory memory on which is recorded instructions for controlling the solenoid assembly.

Execution of the instructions by the processor causes the controller to obtain a plurality of model matrices, including a first model matrix ($A_0$), a second model matrix ($B_0$) and a third model matrix ($C_0$). The controller is configured to obtain (and the method includes obtaining) a coil current ($i_1$) and an eddy current ($i_2$) based at least partially on an applied coil voltage (V) and at least two of the plurality of model matrices. The magnetic flux ($\phi$) is obtained based at least partially on the third model matrix ($C_0$), the coil current ($i_1$) and the eddy current ($i_2$). Operation of the solenoid actuator is controlled based at least partially on the magnetic flux ($\phi$). Controlling operation of the solenoid actuator may include controlling the applied coil voltage (V) to minimize a difference between the magnetic flux ($\phi$) and a desired flux. The magnetic flux ($\phi$) at a time step k may be represented as:

$$\phi(k) = C_0 \begin{bmatrix} i_1(k) \\ i_2(k) \end{bmatrix}.$$

The first model matrix ($A_0$) may be obtained as a four-by-four matrix based partly on an intermediate inductance ($L_{11}$), the coil turn number (N), a coil resistance ($R_1$), an eddy current loop resistance ($R_2$), a sampling time ($\Delta T$) and a distance (d) such that:

$$A_0 = \begin{bmatrix} 1 - L_{11}^{-1} \frac{R_1}{-d^2+2d} \Delta T & L_{11}^{-1} \frac{NR_2}{-d^2+2d} \Delta T \\ L_{11}^{-1} \frac{NR_1}{-d^2+2d} \Delta T & 1 - L_{11}^{-1} \frac{N^2 R_2}{-d^4+4d^3-5d^2+2d} \Delta T \end{bmatrix}.$$

The intermediate inductance ($L_{11}$) of the coil may be based partly on a flux linkage ($\lambda_{ss}$) at a steady state condition and a coil current ($i_{ss}$) at the steady state condition, such that ($L_{11}=d\lambda_{ss}/di_{ss}$). An inductance (L) of the coil at the steady state may be obtained based partly on the intermediate inductance ($L_{11}$), the coil turn number (N) and a distance (d) representing a location of the eddy current relative to the coil such that:

$$L = L_{11} \begin{bmatrix} 1 & \frac{(1-d)}{N} \\ \frac{(1-d)}{N} & \frac{(1-d)}{N^2} \end{bmatrix}.$$

The second model matrix ($B_0$) may be obtained as a two-by-two matrix based partly on an intermediate inductance ($L_{11}$), a sampling time ($\Delta T$) and a distance (d) such that:

$$B_0 = \begin{bmatrix} L_{11}^{-1} \frac{1}{-d^2+2d} \Delta T \\ -L_{11}^{-1} \frac{N}{-d^2+2d} \Delta T \end{bmatrix}.$$

The third model matrix ($C_0$) may be obtained as a two-by-two matrix based partly on an intermediate inductance ($L_{11}$), the coil turn number (N) and a distance (d) such that:

$$C_0 = \begin{bmatrix} \frac{L_{11}}{N} & \frac{L_{11}}{N^2}(1-d)^2 \end{bmatrix}.$$

In a first embodiment, the controller is configured to obtain (and the method includes obtaining) the coil current ($i_1$) and the eddy current ($i_2$) at a time step k based partly on the first model matrix ($A_0$), the second model matrix ($B_0$) and the applied coil voltage (V) such that:

$$\begin{bmatrix} i_1(k+1) \\ i_2(k+1) \end{bmatrix} = A_0 \begin{bmatrix} i_1(k) \\ i_2(k) \end{bmatrix} + B_0 V(k).$$

In a second embodiment, the plurality of model matrices may include a fourth model matrix ($D_0$). In the second embodiment, the coil current ($i_1$) and the eddy current ($i_2$) may be obtained at a time step k based partly on the first model matrix ($A_0$), the second model matrix ($B_0$), the fourth model matrix ($D_0$), the applied coil voltage (V) and the armature velocity (dx/dt) such that:

$$\begin{bmatrix} i_1(k+1) \\ i_2(k+1) \end{bmatrix} = A_0 \begin{bmatrix} i_1(k) \\ i_2(k) \end{bmatrix} + B_0 V(k) + D_0 \partial x/\partial t.$$

The fourth model matrix ($D_0$) may be obtained as a two-by-two matrix based partly on an intermediate inductance ($L_{11}$), the coil turn number (N), a first factor ($g_1$), a second factor ($g_2$), a sampling time ($\Delta T$) and a distance (d) such that:

$$D_0 = \begin{bmatrix} L_{11}^{-1} \dfrac{g_1 - Ng_2}{d^2 - 2d} \Delta T \\ L_{11}^{-1} \dfrac{N^2 g_2 - Ng_1(d^2 - 2d + 1)}{-d^4 + 4d^3 - 5d^2 + 2d} \Delta T \end{bmatrix}.$$

The controller is configured to obtain (and the method includes obtaining) a gain factor ($K_f$) based at least partially on the coil current ($i_1$), a first and a second predetermined constants ($K_{f0}$, $K_{f1}$). The gain factor ($K_f$) may be represented as:

$$\left( K_f = K_{f0} + \frac{K_{f1}}{i_1} \right).$$

A magnetic force (F) is obtained based at least partially on a square of the magnetic flux ($\phi$), the gain factor ($K_f$), a predetermined time constant ($\tau$) and a frequency parameter (s) such that:

$$F = \frac{1}{\tau s + 1}(K_f)\phi^2.$$

The method determines the magnetic flux (i.e., the residual energy) and the corresponding magnetic force which drives the motion of the armature, enabling improved accuracy for the solenoid actuator.

The above features and advantages and other features and advantages of the present disclosure are readily apparent from the following detailed description of the best modes for carrying out the disclosure when taken in connection with the accompanying drawings.

DETAILED DESCRIPTION

Figure 1:
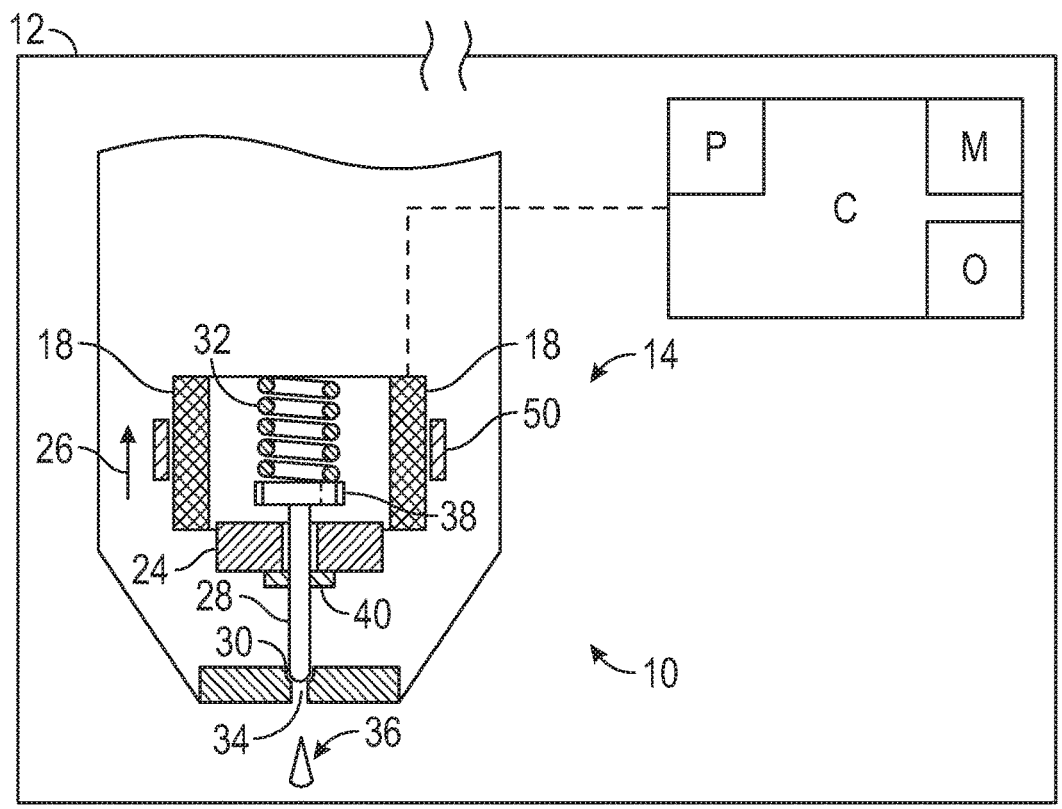
FIG. 1 is a schematic partly sectional fragmentary view of a solenoid assembly having a controller.

Referring to the drawings, wherein like reference numbers refer to like components, FIG. 1 schematically illustrates a solenoid assembly 10, which may be part of a device 12. The device 12 may be a mobile platform, such as, but not limited to, passenger car, sport utility vehicle, light truck, heavy duty vehicle, ATV, minivan, bus, transit vehicle, bicycle, robot, farm implement, sports-related equipment, boat, plane, train or other transportation device. The device 12 may take many different forms and include multiple and/or alternate components and facilities.

Figure 2:
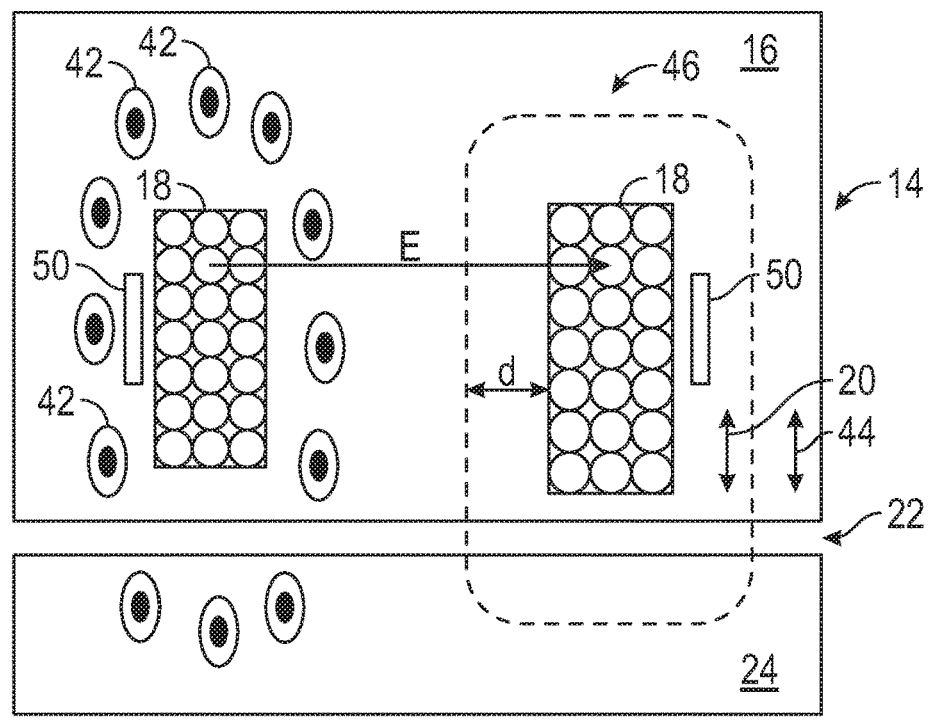
FIG. 2 is a schematic diagram of a portion of the assembly of FIG. 1.

FIG. 2 is a schematic diagram of a portion of the assembly 10. Referring to FIGS. 1-2, the assembly 10 includes a solenoid actuator 14 having a core 16 and a coil 18 configured to be wound at least partially around the core 16. A magnetic flux contribution 20 (and corresponding magnetic force) is generated when an electric current (E) flows through the coil 18. The coil 18 defines a coil turn number (N). In one example, the solenoid actuator 14 is an injector. It is to be appreciated that the solenoid actuator 14 may take other forms, such as but not limited to, a brake actuator, a magnetorheological fluid damper, control valve or a transmission variable force solenoid.

Referring to FIGS. 1 and 2, the solenoid actuator 14 includes an armature 24 that is configured to be movable based on the magnetic flux contribution 20 ($\phi$). The armature defines a position (x) and an armature velocity (dx/dt). The core 16 and the armature 24 may be separated by an air gap 22, as shown in FIG. 2. When the coil 18 is energized by the electric current (E), the armature 24 is attracted by the solenoid poles and moves in the direction 26. Referring to FIG. 1, motion of the armature 24 moves a valve needle 28 from a valve seat 30 against the elastic force of a spring 32. This movement allows pressurized fluid 36 to selectively pass through the opening 34. When the electrical stimulus ends, the magnetic flux contribution 20 diminishes and the valve needle 28 moves towards the valve seat 30 by the action of the spring 32, carrying the armature 24 with it and closing the opening 34. The axial motion of the armature 24 may be restricted by a first stop 38 and a second stop 40. The motion of the armature 24, including its timing, controls the amount of pressurized fluid 36 injected.

Referring to FIG. 2, eddy currents 42 are induced as loops of electrical current within the core 16 by the changing magnetic field. The eddy currents 42 flow in closed loops in planes perpendicular to the magnetic field and provide an eddy flux contribution 44 to the (total) magnetic flux ($\phi$). As noted below, in method 100, the eddy currents 42 are modeled as an imaginary loop 46 (see FIG. 2).

Referring to FIG. 1, the assembly 10 includes a controller C operatively connected to or in electronic communication with the solenoid actuator 14. Referring to FIG. 1, the controller C includes at least one processor P and at least one memory M (or non-transitory, tangible computer readable storage medium) on which are recorded instructions for executing method 100, shown in FIG. 2. The memory M can store controller-executable instruction sets, and the processor P can execute the controller-executable instruction sets stored in the memory M.

The method 100 allows a determination of magnetic flux, indicating the residual energy in the coil 18 when the solenoid actuator 14 is re-energized. If the solenoid actuator 14 is a fuel injector and the device 12 is a vehicle, the method 100 improves fuel economy and reduces calibration time and effort. In a vehicle, multiple injections of fuel that are closely spaced in time and in small quantities may provide many benefits, including reduced fuel penetration, improved mixing, turbulence generation, fewer particulates, improved stability and burn rate modulation for advanced lean combustion engines. The fuel injection rate here needs to be precisely controlled to achieve the above benefits. However, these injections may result in inaccurate metering due to various issues, including injector dynamics and longer time interval for decay of induced eddy currents. The method 100 allows estimation and tuning of magnetic flux (and corresponding magnetic force) which drives the motion of the armature 24 and eventually controls the fuel injection rate.

The controller C of FIG. 1 is specifically programmed to execute the steps of the method 100 (as discussed in detail below with respect to FIG. 3) and may receive inputs from various sensors, including but not limited to, various meters for measuring inductance, capacitance and resistance (such as an LCR meter), flux meter, gauss meter and other devices available to those skilled in the art.

Figure 3:
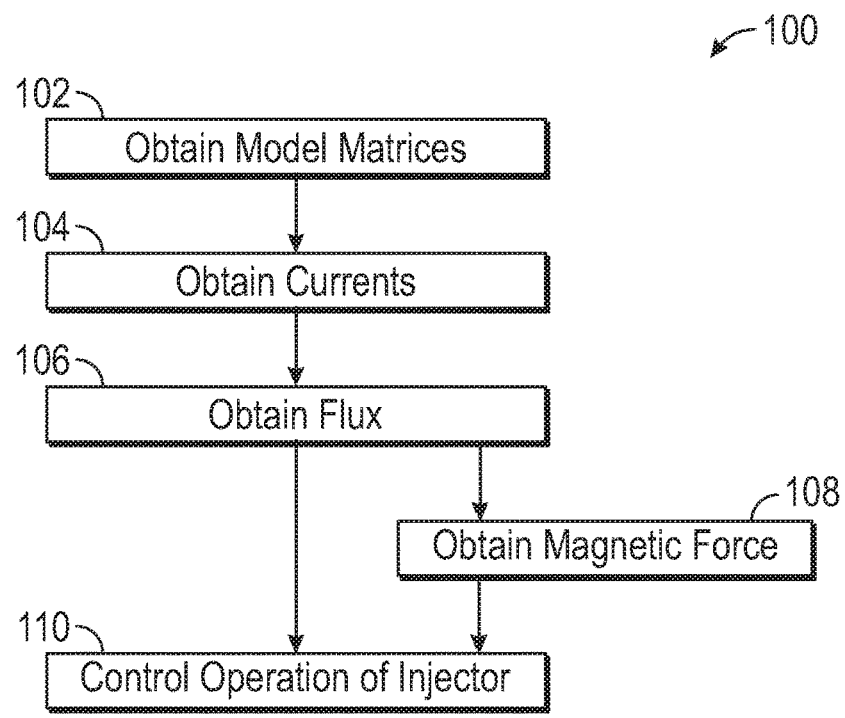
FIG. 3 is a schematic flow diagram for a method executable by the controller of FIG. 1.

Referring now to FIG. 3, a flowchart of the method 100 stored on and executable by the controller C of FIG. 1 is shown. Method 100 need not be applied in the specific order recited herein. Furthermore, it is to be understood that some steps may be eliminated.

Referring to FIG. 3, method 100 may begin with block 102, where the controller C is programmed or configured to obtain a plurality of model matrices, including a first model matrix ($A_0$), a second model matrix ($B_0$) and a third model matrix ($C_0$). The first model matrix ($A_0$) may be obtained as a four-by-four matrix based partly on an intermediate inductance ($L_{11}$), the coil turn number (N), a coil resistance ($R_1$), an eddy current loop resistance ($R_2$), a sampling time ($\Delta T$) and the distance (d). The distance (d) represents the normalized distance of the eddy currents 42, modeled as an imaginary loop 46 (see FIG. 2), relative to the coil 18.

$$A_0 = \begin{bmatrix} 1 - L_{11}^{-1} \frac{R_1}{-d^2 + 2d} \Delta T & L_{11}^{-1} \frac{NR_2}{-d^2 + 2d} \Delta T \\ L_{11}^{-1} \frac{NR_1}{-d^2 + 2d} \Delta T & 1 - L_{11}^{-1} \frac{N^2 R_2}{-d^4 + 4d^3 - 5d^2 + 2d} \Delta T \end{bmatrix}.$$

Multiple reference flux profiles, along with their respective associated voltage measurements may be used to fit the model and obtain the plurality of matrices. Referring to FIGS. 1 and 2, the assembly 10 may include a search coil 50, also known as an induction magnetometer. The search coil 50 is capable of measuring changing magnetic flux and may be employed to generate the reference flux profiles. The magnetic flux of each reference flux profile may be obtained based at least partially on the applied search coil voltage and the turn number ($N_{search}$) of the search coil 50 as follows:

$$\phi = \frac{\int V_{coil} dt}{N_{search}}$$

Figure 4:
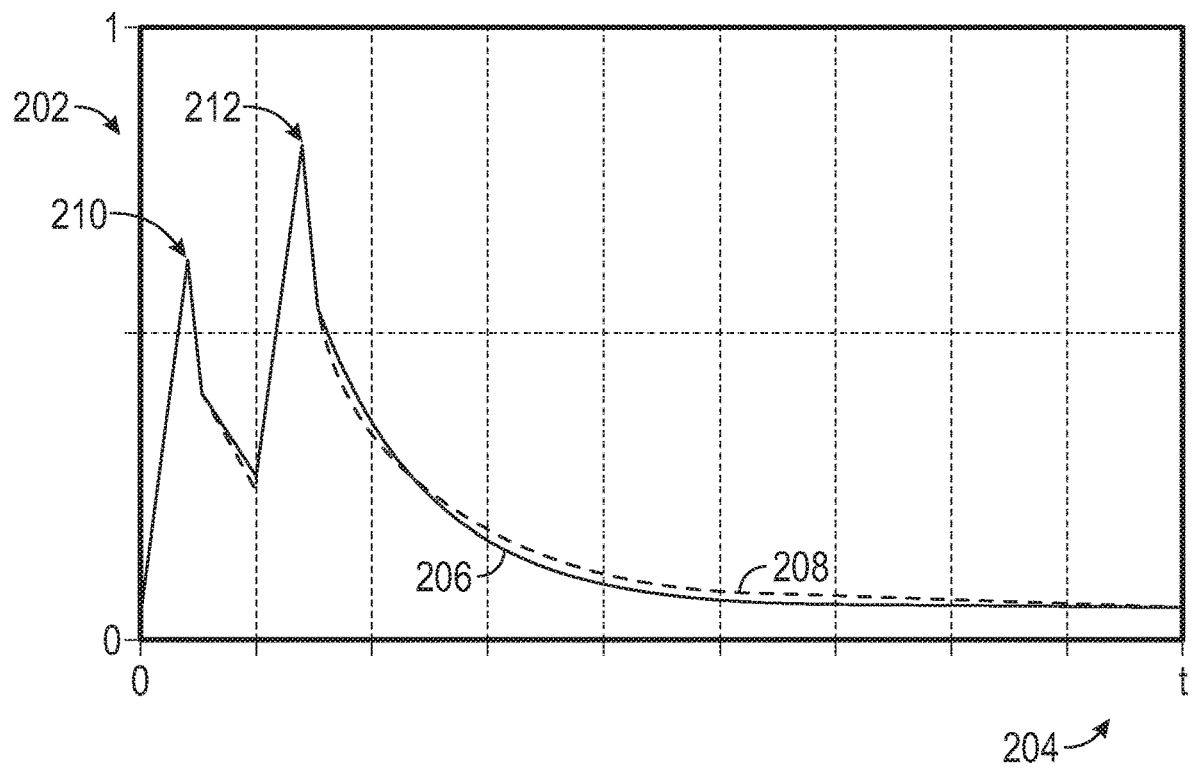
FIG. 4 is a graph illustrating measured flux and modeled flux, with magnetic flux on the vertical axis and time on the horizontal axis.

The reference flux profiles may also be used for validation. FIG. 4 is a graph of measured flux (trace 208) and modeled flux (trace 206), with magnetic flux (normalized) on the vertical axis 202 and time (t) on the horizontal axis 204. Referring to FIG. 4, first and second injections occur at peaks 210, 212, respectively.

The second model matrix ($B_0$) may be obtained as a two-by-two matrix based partly on an intermediate inductance ($L_{11}$), a sampling time ($\Delta T$) and a distance (d) such that:

$$B_0 = \begin{bmatrix} L_{11}^{-1} \frac{1}{-d^2 + 2d} \Delta T \\ -L_{11}^{-1} \frac{N}{-d^2 + 2d} \Delta T \end{bmatrix}.$$

The third model matrix ($C_0$) may be obtained as a two-by-two matrix based partly on an intermediate inductance ($L_{11}$), the coil turn number (N) and a distance (d) such that:

$$C_0 = \begin{bmatrix} \frac{L_{11}}{N} & \frac{L_{11}}{N^2}(1-d)^2 \end{bmatrix}.$$

The intermediate inductance ($L_{11}$) of the coil 18 may be based partly on a flux linkage ($\lambda_{ss}$) at a steady state condition and a coil current ($i_{ss}$) at the steady state condition, such that ($L_{11} = d\lambda_{ss}/di_{ss}$). The controller C may be configured to obtain an inductance (L) of the coil 18 at a steady state based partly on the intermediate inductance ($L_{11}$), the coil turn number (N) and a distance (d) representing a normalized distance of the eddy current 42 relative to the coil 18 such that:

$$L = L_{11} \begin{bmatrix} 1 & \frac{(1-d)}{N} \\ \frac{(1-d)}{N} & \frac{(1-d)}{N} \end{bmatrix}.$$

In block 104 of FIG. 3, the controller C is programmed to obtain a coil current ($i_1$) and an eddy current ($i_2$) based partly on the first model matrix ($A_0$), the second model matrix ($B_0$) and the applied coil voltage (V). In a first embodiment, the coil current ($i_1$) and the eddy current ($i_2$) at a continuous time (t) may be represented in terms of the applied coil voltage (V), and matrices A and B as follows:

$$\begin{bmatrix} \partial i_1/dt \\ \partial i_2/dt \end{bmatrix} = A \begin{bmatrix} i_1 \\ i_2 \end{bmatrix} + BV.$$

The controller C may be programmed to obtain a coil current ($i_1$) and an eddy current ($i_2$) at a (discrete) time step k as follows:

$$\begin{bmatrix} i_1(k+1) \\ i_2(k+1) \end{bmatrix} = A_0 \begin{bmatrix} i_1(k) \\ i_2(k) \end{bmatrix} + B_0 V(k).$$

In a second embodiment, the plurality of model matrices may include a fourth model matrix ($D_0$). Per block 102, the fourth model matrix ($D_0$) may be obtained as a two-by-two matrix based partly on an intermediate inductance ($L_{11}$), the coil turn number (N), a first factor ($g_1$), a second factor ($g_2$), a sampling time ($\Delta T$) and a distance (d) such that:

$$D_0 = \begin{bmatrix} L_{11}^{-1} \frac{g_1 - Ng_2}{d^2 - 2d} \Delta T \\ L_{11}^{-1} \frac{N^2 g_2 - Ng_1(d^2 - 2d + 1)}{-d^4 + 4d^3 - 5d^2 + 2d} \Delta T \end{bmatrix}$$

The first factor ($g_1$) and the second factor ($g_2$) may be defined as follows (with x being armature position and ($\lambda_1$, $\lambda_2$) being the flux linkage of the coil 18 and the eddy current 42, respectively):

$$g_1 = \frac{\partial \lambda_1}{\partial x}; g_2 = \frac{\partial \lambda_2}{\partial x}.$$

In the second embodiment, per block 104, the controller C may be configured to obtain the coil current ($i_1$) and the eddy current ($i_2$) at a time step k based partly on the first model matrix ($A_0$), the second model matrix ($B_0$), the fourth model matrix ($D_0$), the applied coil voltage (V) and the armature velocity (dv/dt) such that:

$$\begin{bmatrix} i_1(k+1) \\ i_2(k+1) \end{bmatrix} = A_0 \begin{bmatrix} i_1(k) \\ i_2(k) \end{bmatrix} + B_0 V(k) + D_0 \partial x / dt.$$

The coil current ($i_1$) and the eddy current ($i_2$) at a continuous time (t) may be obtained in terms of the applied coil voltage (V), the armature velocity (dx/dt) and matrices A, B, C and D as follows:

$$\begin{bmatrix} \partial i_1 / dt \\ \partial i_2 / dt \end{bmatrix} = A \begin{bmatrix} i_1(t) \\ i_2(t) \end{bmatrix} + BV + D \partial x / dt.$$

In block 106 of FIG. 3, the controller C is programmed to obtain the (total) magnetic flux ($\phi$) at the time step k based at least partially on the third model matrix ($C_0$), the coil current ($i_1$) and the eddy current ($i_2$) as follows:

$$\phi(k) = C_0 \begin{bmatrix} i_1(k) \\ i_2(k) \end{bmatrix}.$$

In block 108 of FIG. 3, the controller C is programmed to obtain a magnetic force (F) based at least partially on a square of the magnetic flux ($\phi$), a gain factor ($K_f$), a predetermined time constant ($\tau$) and frequency parameter (s) such that:

$$F = \frac{1}{\tau s + 1}(K_f)\phi^2.$$

The gain factor ($K_f$) is based at least partially on the coil current ($i_1$), and first and second predetermined constants ($K_{f0}$, $K_{f1}$). The gain factor ($K_f$) may be obtained via calibration of known magnetic force profiles as follows:

$$K_f = K_{f0} + \frac{K_{f1}}{i_1}$$

In block 110 of FIG. 3, the controller C is programmed to control operation of the solenoid actuator 14 based at least partially on the magnetic flux ($\phi$) (and/or the magnetic force (F)). Controlling operation of the solenoid actuator 14 may include controlling the applied coil voltage (V) to minimize a difference between the magnetic flux ($\phi$) (estimated in block 106) and a desired flux. The desired flux may be set or calibrated offline. In one example, the desired flux is based on finite element analysis. The controller C (and execution of the method 100) improves the functioning of the assembly 10 by enabling "tuning" of the solenoid actuator 14 to a desired flux. The method 100 enables model-based calibration and control, especially for multiple injections in rapid succession, such as on the order of microns ($10^{-6}$ seconds).

For example, the controller C may regulate the error between the estimated flux and the desired flux via a proportional-integral-derivative (PID) unit, a model predictive control unit (MPC) or other closed loop unit available to those skilled in the art. Additionally, the controller C may include an observer O, such as but not limited to a Luenberger observer, incorporating blocks 106 and 108, with electric current as a measurement.

The controller C of FIG. 1 may be an integral portion of, or a separate module operatively connected to, other controllers of the device 12. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIG.s are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:
1. A solenoid assembly comprising:
a solenoid actuator having a core;
a coil configured to be wound at least partially around the core such that a magnetic flux ($\phi$) is generated when an electric current flows through the coil, the coil defining a coil turn number (N);

an armature configured to be movable based on the magnetic flux ($\phi$), the armature defining a position (x) and an armature velocity (dx/dt);

a controller operatively connected to the coil and having a processor and tangible, non-transitory memory on which is recorded instructions, execution of the instructions by the processor causing the controller to:

obtain a plurality of model matrices, including a first model matrix ($A_0$), a second model matrix ($B_0$) and a third model matrix ($C_0$);

obtain a coil current ($i_1$) and an eddy current ($i_2$) based at least partially on an applied coil voltage (V) and at least two of the plurality of model matrices;

obtain the magnetic flux ($\phi$) based at least partially on the third model matrix ($C_0$), the coil current ($i_1$) and the eddy current ($i_2$); and control operation of the solenoid actuator based at least partially on the magnetic flux ($\phi$).

2. The assembly of claim 1, wherein controlling operation of the solenoid actuator includes:

controlling the applied coil voltage (V) to minimize a difference between the magnetic flux ($\phi$) and a desired flux, the magnetic flux ($\phi$) at a time step k being represented as:

$$\phi(k) = C_0 \begin{bmatrix} i_1(k) \\ i_2(k) \end{bmatrix}.$$

3. The assembly of claim 1, wherein:

the first model matrix ($A_0$) is a four-by-four matrix based partly on an intermediate inductance ($L_{11}$), the coil turn number (N), a coil resistance ($R_1$), an eddy current loop resistance ($R_2$), a sampling time ($\Delta T$) and a distance (d) such that:

$$A_0 = \begin{bmatrix} 1 - L_{11}^{-1} \frac{R_1}{-d^2+2d} \Delta T & L_{11}^{-1} \frac{NR_2}{-d^2+2d} \Delta T \\ L_{11}^{-1} \frac{NR_1}{-d^2+2d} \Delta T & 1 - L_{11}^{-1} \frac{N^2 R_2}{-d^4+4d^3-5d^2+2d} \Delta T \end{bmatrix}.$$

4. The assembly of claim 1, wherein:

the second model matrix ($B_0$) is a two-by-two matrix based partly on an intermediate inductance ($L_{11}$), a sampling time ($\Delta T$) and a distance (d) such that:

$$B_0 = \begin{bmatrix} L_{11}^{-1} \frac{1}{-d^2+2d} \Delta T \\ -L_{11}^{-1} \frac{N}{-d^2+2d} \Delta T \end{bmatrix}.$$

5. The assembly of claim 1, wherein:

the third model matrix ($C_0$) is a two-by-two matrix based partly on an intermediate inductance ($L_{11}$), the coil turn number (N) and a distance (d) such that:

$$C_0 = \begin{bmatrix} \frac{L_{11}}{N} & \frac{L_{11}}{N^2}(1-d)^2 \end{bmatrix}.$$

6. The assembly of claim 1, wherein the controller is configured to:

obtain the coil current ($i_1$) and the eddy current ($i_2$) at a time step k based partly on the first model matrix ($A_0$), the second model matrix ($B_0$) and the applied coil voltage (V) such that:

$$\begin{bmatrix} i_1(k+1) \\ i_2(k+1) \end{bmatrix} = A_0 \begin{bmatrix} i_1(k) \\ i_2(k) \end{bmatrix} + B_0 V(k).$$

7. The assembly of claim 1, wherein:

the plurality of model matrices includes a fourth model matrix ($D_0$); and the controller is configured to obtain the coil current ($i_1$) and the eddy current ($i_2$) at a time step k based partly on the first model matrix ($A_0$), the second model matrix ($B_0$), the fourth model matrix ($D_0$), the applied coil voltage (V) and the armature velocity (dx/dt) such that:

$$\begin{bmatrix} i_1(k+1) \\ i_2(k+1) \end{bmatrix} = A_0 \begin{bmatrix} i_1(k) \\ i_2(k) \end{bmatrix} + B_0 V(k) + D_0 \partial x / dt.$$

8. The assembly of claim 7, wherein:

the fourth model matrix ($D_0$) is a two-by-two matrix based partly on an intermediate inductance ($L_{11}$), the coil turn number (N), a first factor ($g_1$), a second factor ($g_2$), a sampling time ($\Delta T$) and a distance (d) such that:

$$D_0 = \begin{bmatrix} L_{11}^{-1} \frac{g_1 - Ng_2}{d^2 - 2d} \Delta T \\ L_{11}^{-1} \frac{N^2 g_2 - Ng_1(d^2 - 2d + 1)}{-d^4 + 4d^3 - 5d^2 + 2d} \Delta T \end{bmatrix}.$$

9. The assembly of claim 1, wherein the controller is further configured to:

obtaining a gain factor ($K_f$) based at least partially on the coil current ($i_1$), a first and a second predetermined constants ($K_{f0}$, $K_{f1}$), via the controller, the gain factor ($K_f$) being represented as $$\left( K_f = K_{f0} + \frac{K_{f1}}{i_1} \right);$$

and obtain a magnetic force (F) based at least partially on a square of the magnetic flux ($\phi$), the gain factor ($K_f$), a predetermined time constant ($\tau$) and a frequency parameter (s) such that:

$$F = \frac{1}{\tau s + 1}(K_f)\phi^2.$$

10. The assembly of claim 1, wherein the solenoid actuator is an injector.

11. A method for controlling operation of a solenoid assembly with a solenoid actuator having a core, a coil configured to be wound at least partially around the core such that a magnetic flux ($\phi$) is generated when an electric current flows through the coil, the coil defining a coil turn number (N), an armature configured to be movable based on the magnetic flux ($\phi$) and a controller with a processor and tangible, non-transitory memory on which is recorded instructions, the method comprising:

obtaining a plurality of model matrices, including a first model matrix ($A_0$), a second model matrix ($B_0$) and a third model matrix ($C_0$);

obtaining a coil current ($i_1$) and an eddy current ($i_2$) based at least partially on an applied coil voltage (V) and the plurality of model matrices;

obtaining the magnetic flux ($\phi$) based at least partially on the third model matrix ($C_0$), the coil current ($i_1$) and the eddy current ($i_2$); and controlling operation of the solenoid actuator based at least partially on the magnetic flux ($\phi$).

12. The method of claim 11, wherein controlling operation of the solenoid actuator includes:

controlling the applied coil voltage (V) to minimize a difference between the magnetic flux ($\phi$) and a desired flux, the magnetic flux ($\phi$) at a time step k being represented as:

$$\phi(k) = C_0 \begin{bmatrix} i_1(k) \\ i_2(k) \end{bmatrix}.$$

13. The method of claim 11, wherein obtaining the plurality of model matrices includes:

obtaining the first model matrix ($A_0$) as a four-by-four matrix based partly on an intermediate inductance ($L_{11}$), the coil turn number (N), a coil resistance ($R_1$), an eddy current loop resistance ($R_2$), a sampling time ($\Delta T$) and a distance (d) such that:

$$A_0 = \begin{bmatrix} 1 - L_{11}^{-1} \frac{R_1}{-d^2+2d} \Delta T & L_{11}^{-1} \frac{NR_2}{-d^2+2d} \Delta T \\ L_{11}^{-1} \frac{NR_1}{-d^2+2d} \Delta T & 1 - L_{11}^{-1} \frac{N^2 R_2}{-d^4+4d^3-5d^2+2d} \Delta T \end{bmatrix}.$$

14. The method of claim 13, wherein the method includes:

obtaining the intermediate inductance ($L_{11}$) of the coil based partly on a flux linkage ($\lambda_{ss}$) at a steady state condition and a coil current ($i_{ss}$) at the steady state condition, such that ($L_{11} = d\lambda_{ss}/di_{ss}$); and obtaining an inductance (L) of the coil at a steady state based partly on the intermediate inductance ($L_{11}$), the coil turn number (N) and a distance (d) representing a location of the eddy current relative to the coil such that:

$$L = L_{11} \begin{bmatrix} 1 & \frac{(1-d)}{N} \\ \frac{(1-d)}{N} & \frac{(1-d)}{N^2} \end{bmatrix}.$$

15. The method of claim 11, wherein obtaining the plurality of model matrices includes:

obtaining the second model matrix ($B_0$) as a two-by-two matrix based partly on an intermediate inductance ($L_{11}$), a sampling time ($\Delta T$) and a distance (d) such that:

$$B_0 = \begin{bmatrix} L_{11}^{-1} \frac{1}{-d^2+2d} \Delta T \\ -L_{11}^{-1} \frac{N}{-d^2+2d} \Delta T \end{bmatrix}.$$

16. The method of claim 11, wherein obtaining the plurality of model matrices includes:

obtaining the third model matrix ($C_0$) as a two-by-two matrix based partly on an intermediate inductance ($L_{11}$), the coil turn number (N) and a distance (d) such that:

$$C_0 = \begin{bmatrix} \frac{L_{11}}{N} & \frac{L_{11}}{N^2}(1-d)^2 \end{bmatrix}.$$

17. The method of claim 11, wherein obtaining the coil current ($i_1$) and the eddy current ($i_2$) includes:

obtaining the coil current ($i_1$) and the eddy current ($i_2$) at a time step k based partly on the first model matrix ($A_0$), the second model matrix ($B_0$) and the applied coil voltage (V) such that:

$$\begin{bmatrix} i_1(k+1) \\ i_2(k+1) \end{bmatrix} = A_0 \begin{bmatrix} i_1(k) \\ i_2(k) \end{bmatrix} + B_0 V(k).$$

18. The method of claim 11, wherein obtaining the plurality of model matrices includes:

obtaining a fourth model matrix ($D_0$) as a two-by-two matrix based partly on an intermediate inductance ($L_{11}$), the coil turn number (N), a first factor ($g_1$), a second factor ($g_2$), a sampling time ($\Delta T$) and a distance (d) such that:

$$D_0 = \begin{bmatrix} L_{11}^{-1} \frac{g_1 - Ng_2}{d^2 - 2d} \Delta T \\ L_{11}^{-1} \frac{N^2 g_2 - Ng_1(d^2 - 2d + 1)}{-d^4 + 4d^3 - 5d^2 + 2d} \Delta T \end{bmatrix}.$$

19. The method of claim 18, wherein obtaining the coil current ($i_1$) and the eddy current ($i_2$) includes:

obtaining the coil current ($i_1$) and the eddy current ($i_2$) at a time step k based partly on the first model matrix ($A_0$), the second model matrix ($B_0$), the fourth model matrix ($D_0$), the applied coil voltage (V) and an armature velocity (dx/dt) such that:

$$\begin{bmatrix} i_1(k+1) \\ i_2(k+1) \end{bmatrix} = A_0 \begin{bmatrix} i_1(k) \\ i_2(k) \end{bmatrix} + B_0 V(k) + D_0 \partial x/dt.$$

20. The method of claim 11, further comprising:

obtaining a gain factor ($K_f$) based at least partially on the coil current ($i_1$), a first and a second predetermined constants ($K_{f0}$, $K_{f1}$), via the controller, the gain factor ($K_f$) being represented as $$\left(K_f = K_{f0} + \frac{K_{f1}}{i_1}\right);$$

and obtaining a magnetic force (F) based at least partially on a square of the magnetic flux ($\phi$), the gain factor ($K_f$), a predetermined time constant ($\tau$) and a frequency parameter (s), via the controller, such that:

$$F = \frac{1}{\tau s + 1}(K_f)\phi^2.$$

* * * * *